April 16, 1957            H. P. GRAY            2,788,728
CULTIVATING ATTACHMENT FOR TRACTORS
Filed July 27, 1954            2 Sheets-Sheet 1
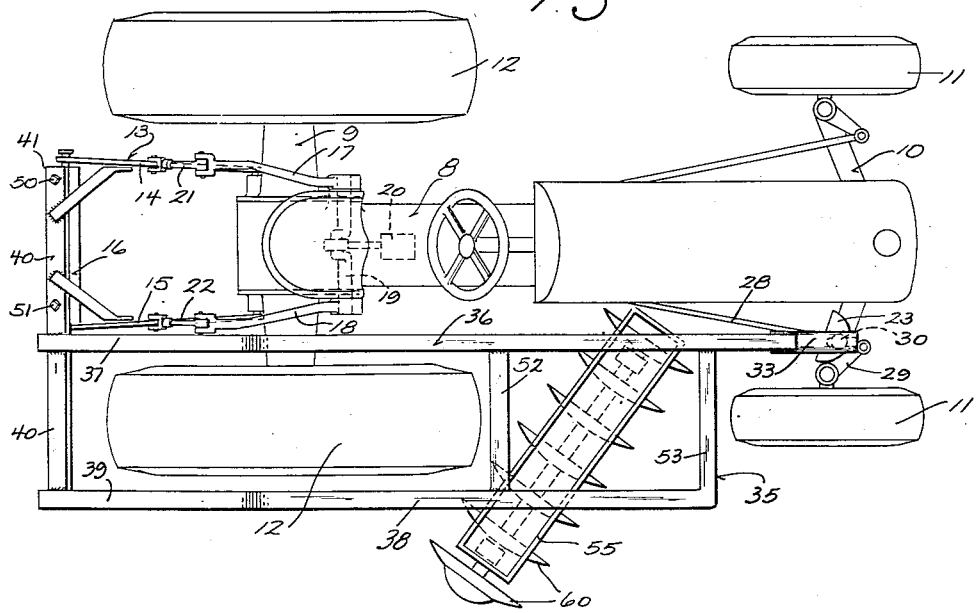
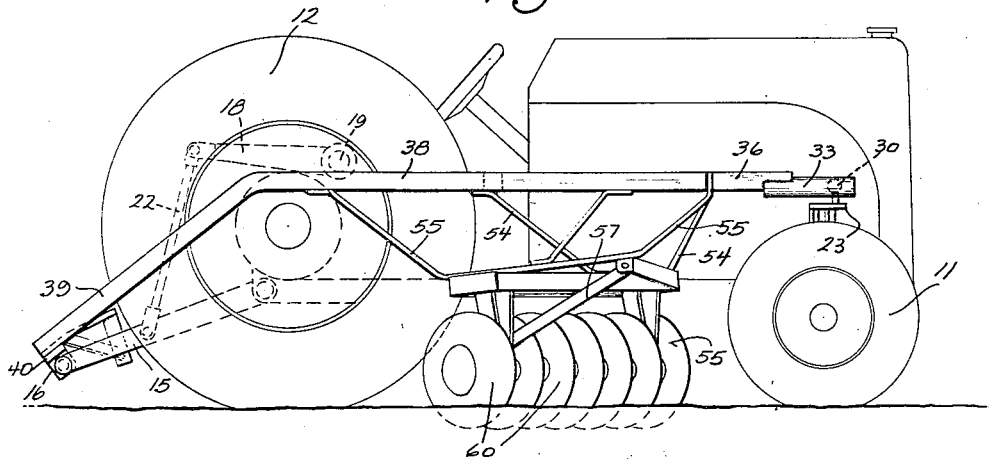
INVENTOR.
HAROLD P. GRAY
BY
Wheeler, Wheeler & Wheeler
ATTORNEYS

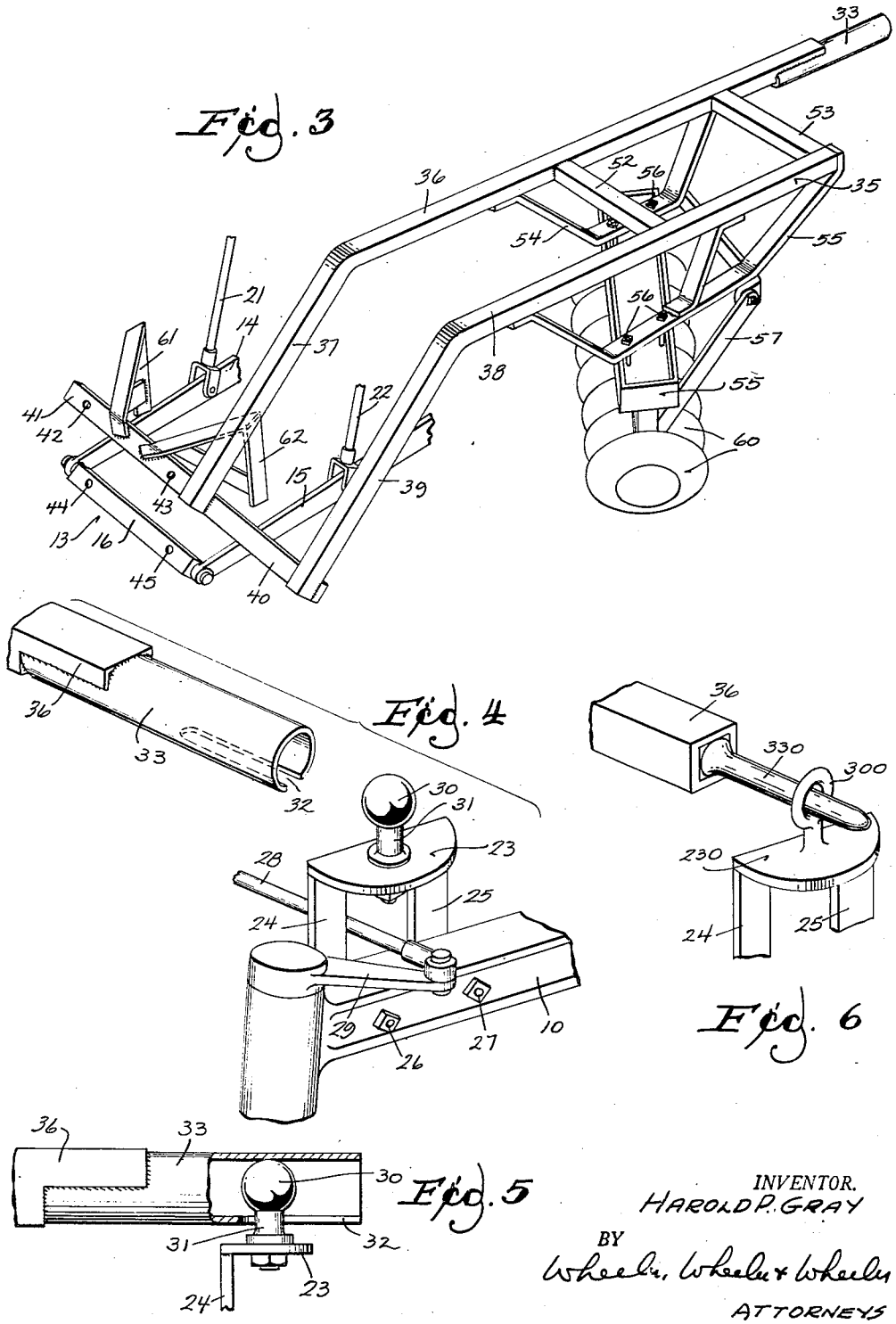

United States Patent Office 2,788,728
Patented Apr. 16, 1957

2,788,728
CULTIVATING ATTACHMENT FOR TRACTORS

Harold P. Gray, Traverse City, Mich.

Application July 27, 1954, Serial No. 445,987

14 Claims. (Cl. 97—47.37)

This invention relates to a cultivating attachment for tractors.

The attachment comprises a sub-frame with means for freely disengageable universal connection with the front tractor axle and means for bolted connection to the tractor draw bar and hydraulic lift assembly. The sub-frame straddles one rear wheel of the tractor and carries its working implement, such as a harrow, between the front and rear wheels in a position where it is directly within the view of the operator to enable him to manipulate the tractor to cultivate in immediate proximity to trees or plants.

By simply disconnecting one or two bolts and attaching the sub-frame to the draw bar, it is possible to lift the entire sub-frame clear of the rear tractor wheel and to disengage it from its universal connection to the front axle, leaving the tractor entirely unencumbered for the performance of other duties. Remounting on the tractor is equally simple, the forward end connection requiring only manipulation and the rear end connection requiring not more than two bolts for secure attachment to the draw bar.

In the drawings:

Fig. 1 is a plan view of my attachment as it appears mounted on a tractor for use.

Fig. 2 is a view of the mounted attachment as it appears in side elevation.

Fig. 3 is a view in perspective showing my complete attachment as it appears when disconnected from the tractor, portions of the tractor draw bar and lift mechanism being fragmentarily shown.

Fig. 4 is a greatly enlarged detail view in perspective showing the universal and freely disengageable connection between my attachment and the front axle of the tractor, both being fragmentarily illustrated and in relatively separated positions.

Fig. 5 is a fragmentary detail view taken in axial section through the front end connection.

Fig. 6 is a fragmentary detail view showing in perspective a modified type of universal front end connection.

The tractor illustrated is of a well known type having a frame or body portion 8 connecting its rear axle 9 with its front axle 10. The front axle carries dirigible wheels 11. The rear axle carries power driven wheels 12.

Pivotally connected with the rear axle 9 is a draw bar assembly generically designated by reference character 13. It comprises a pair of links 14, 15 pivoted at their forward ends to the axle and cross connected at their rear ends by the bar 16, as best shown in Fig. 3. This well known tractor has lift arms 17, 18 mounted on a crank shaft 19 to be operated hydraulically by piston 20, these arms being connected by links 21 and 22 with the links 14 and 15 of the draw bar assembly 13.

For the purpose of my attachment, I mount permanently on the front axle 10 a fitting 23 which comprises a pair of spaced legs 24, 25 bolted at 26, 27 to the axle and providing clearance between them for the drag link 28 leading to the steering arm 29.

The fitting 23 carries a ball 30 supported by a neck 31 receivable into the slot 32 in a tube 33 which has sufficient diameter to receive the ball 30. The tube 33 projects forwardly from the front end of the implement-carrying sub-frame 35 of the present invention. By manipulating the tubular socket 33 toward the right as viewed in Fig. 4, it is readily engaged with the ball to provide a universal connection between the sub-frame 35 and the front axle, being engageable without tools by merely manipulating the sub-frame in a forward direction respecting the axle and disengageable solely by a relative rearward manipulation of the sub-frame.

The sub-frame 35 comprises a longitudinal bar portion 36 which extends across the rear axle 9 inside the wheel 12 to a position well behind the wheel. The tube 33 above described projects forwardly from the extreme front end of bar 36. Bar 36 is turned downwardly at 37 after spanning the rear axle.

The sub-frame further includes an outside frame member 38 which passes the outside of wheel 12, beyond the axle, and is bent downwardly at 39 parallel to the downwardly extending portion 37 of bar member 36.

The downwardly formed portions 37 and 39 of frame members 36 and 38 are connected transversely of their lower rear ends by the cross bar 40 which projects at 41 behind the tractor and is provided with bolt holes at 42 and 43 registrable with corresponding bolt holes 44 and 45 in the draw bar so that, when the cross bar 40 is registered with the draw bar, a pair of bolts at 50 and 51 will secure the sub-frame to the draw bar to be propelled thereby when the tractor moves and to be raised and lowered with the draw bar by arms 17 and 18 and links 21 and 22.

Adjacent the forward end of the outer sub-frame member 38, it is connected at longitudinally spaced points with the inner frame member 36 by cross members 52 and 53. Brackets 54 and 55 depending from the frame members 36 and 38 forwardly of wheel 12 support any desired implement such as the conventional cultivator 55 which is bolted at 56 to the brackets 54 and 55 and is braced therefrom by arms 57. Details of the cultivator 55 form no part of the present invention. As illustrated, the cultivator comprises the usual coulter disks 60. These may be lifted from the ground by the hydraulically operated arms 17, 18, acting through the sub-frame as a whole. The arms may also be used to regulate the depth to which the disks will penetrate the soil during cultivation.

Although it is not strictly necessary, I prefer to provide the cross member 40 of my attachment with vertical bearing plates 61 and 62 appropriately braced from the extension 41 of cross member 40 and disposed to lie within the draw bar links 14 and 15 in bearing engagement with the inner faces of such links. These stabilize the draw bar linkage during actual use and assist in absorbing side thrust resulting from the angular operation of the coulter blades 60.

When it is desired to dismount the attachment, it is only necessary to remove bolts at 50 and 51. This completely frees the rear end of the sub-frame from connection with the draw bar. There is no connection of the sub-frame at its rear end to any part of the tractor.

With the bolts 50 and 51 disconnected, it is readily possible to lift the rear end of the sub-frame sufficiently to clear the top of the rear tractor wheel 12, whereupon the entire sub-frame may be swung laterally about its universal connection with the front axle. As soon as the sub-frame is clear of the wheel, it may be drawn rearwardly to disengage its tubular socket 33 from ball 30, this being the only connection to the front of the tractor. The attachment is now entirely free and may be stored, leaving the tractor unencumbered. The only part of the entire apparatus which remains attached to the tractor is bracket 23 and the ball 30 mounted thereon.

If desired, the bracket may take the form indicated at 230 in Fig. 6, being provided with an eye bolt 300 into which projects loosely a prong 330 extending forwardly from the front end of the inner longitudinal bar 36 of the sub-frame. This type of connection is simple and universal and just as readily engaged and disengaged as the connection shown in Figs. 12 and 5.

When it is desired to mount the cultivating attachment on the tractor, the sub-frame is set on the ground beside the tractor and at an angle rearwardly and outwardly therefrom. The inner frame member 36 projects between the front and rear wheels of the tractor. The extension 33, or prong 330, is engaged with the ball 30 or the eye 300 as the case may be. Thereupon the rear end of the sub-frame is lifted and swung laterally, and then lowered to embrace the rear tractor wheel between the frame members 37 and 39. At this point, the transverse frame member 40 can readily be registered with the draw bar cross member 16 and these parts are bolted together. This completes the mounting of the sub-frame to the tractor and the attachment is ready for use.

I claim:

1. An attachment for a tractor having front and rear axles and wheels, said attachment comprising a rigid sub-frame having longitudinal frame members adapted to lie inside and outside one of the rear tractor wheels, the front of the tractor and the front of the sub-frame having a universally pivotal connection freely engageable and disengageable in relatively longitudinal movement, the rear end of the sub-frame and the rear end of the tractor having disengageable means providing for connection during use.

2. The device of claim 1 in which the universally pivotal connection between the front of the sub-frame and the front of the tractor comprises a ball having a neck and a longitudinally opening tubular socket adapted to receive the ball and having a slot accommodating the neck.

3. The device of claim 1 in which the universally pivotal connection between the front end of the tractor and the front end of the attachment comprises a longitudinally projecting peg and an eye in which said peg is loosely engaged for disengagement in a direction longitudinally of the tractor.

4. The device of claim 1 in which the tractor is further provided at its rear end with a draw bar including a transverse member and linkage connecting such member with the tractor, the rear end of said sub-frame having a transverse member detachably connected with the transverse member of the draw bar for transmitting tractor movement to the sub-frame.

5. The device of claim 4 in which the said longitudinal frame member adapted to lie inside the rear wheel is positioned above the rear axle, and means on the sub-frame for supporting an implement directly forwardly of said rear tractor wheel, the universal pivotal connection between the forward end of the sub-frame and the front of the tractor accommodating lateral and vertical pivotal movement of the sub-frame in manipulation of the sub-frame to and from position respecting said wheel.

6. In a device of the character described for application to a tractor having front and rear axles and wheels, the combination with a bracket having means for permanent connection with the front tractor axle, of a rigid sub-frame having an inner frame member projecting toward said bracket, means on said inner sub-frame member and said bracket freely engageable and disengageable longitudinally of the tractor and freely movable universally in relative pivotal movement when engaged, said inner sub-frame member extending rearwardly past the rear axle at the inside of the rear wheel of the tractor, an outer sub-frame member generally paralleling the inner sub-frame member and spaced therefrom to lie outside of the rear tractor wheel aforesaid, transversely extending sub-frame members connecting the inner and outer sub-frame members aforesaid, one of the transversely extending sub-frame members being extended behind the tractor and provided with means for tractor connection, and an implement mounted on the sub-frame forwardly of said rear wheel for pivotal movement with said sub-frame upon the pivotal connection provided between the inner sub-frame member and the front axle bracket.

7. The device of claim 6 in which the universally movable pivotal connection between the inner sub-frame member and the front axle bracket comprises a tubular socket projecting forwardly from said member, and a neck projecting upwardly from the bracket and provided with a head receivable into said socket, said socket having a downwardly opening slot into which said neck is receivable.

8. The device of claim 6 in which the universally movable pivotal connection between the inner sub-frame member and the front axle bracket comprises a prong projecting forwardly from the inner sub-frame member, and an eye mounted on said bracket and in which said prong is loosely engaged to be disengaged therefrom upon rearward retractive movement.

9. The device of claim 6 in which the tractor is further provided with a draw bar assembly comprising links and a cross member with which the unilaterally extended sub-frame member has connection.

10. The device of claim 9 in which the last mentioned sub-frame member is provided with thrust plates in bearing engagement with opposite faces of the draw bar links of the tractor whereby to stiffen the draw bar assembly of the tractor against side thrust of the sub-frame.

11. For use with a tractor having draw bar links and hydraulic mechanism connected therewith, an attachment having means for supporting a ground working implement, the attachment having a detachable means for pivotally connecting it with the front end of the tractor and having a laterally projecting arm in detachable connection with said links, said arm having a thrust member mounted thereon and supported in vertical sliding bearing engagement with a side face of one of said links in a direction to transmit the lateral thrust of said attachment to the last mentioned link at a point spaced from the connection of said arm to the link, the said member and face having bearing surfaces, one of which is elongated vertically, thereby freely accommodating relative vertical movement between the link and arm.

12. The device of claim 11 in which said arm is further provided with another thrust member oppositely engaged with a lateral face of the other of said links, the two thrust members being in rigid connection with said arm and spaced to lie in lateral thrust bearing contact with the respective links whereby to rigidify the links against lateral displacement, the second thrust member having a bearing surface elongated vertically for freely accommodating said relative vertical movement while maintaining the links rigid against lateral displacement as aforesaid.

13. The device of claim 12 in which the said thrust members are freely disengageable from the link in an upward direction and freely engageable therewith in a downward direction, the said connection to the tractor at the front end thereof being freely engageable and disengageable in a forward and rearward direction and being freely pivotal universally to accommodate upward, downward and lateral pivoting movement of the attachment respecting the front end of the tractor.

14. The device of claim 13 in which the tractor attachment comprises inner and outer frame members spaced to receive a rear tractor wheel between them, the means for implement mounting being disposed forwardly of the position of such wheel.

References Cited in the file of this patent

UNITED STATES PATENTS

| | | |
|---|---|---|
| 2,407,006 | Harris | Sept. 3, 1946 |
| 2,473,357 | Blunier | June 14, 1949 |
| 2,561,650 | Carlson | July 24, 1951 |
| 2,636,428 | Pratt | Apr. 28, 1953 |